(12) United States Patent
Podlesny et al.

(10) Patent No.: US 10,860,640 B2
(45) Date of Patent: Dec. 8, 2020

(54) PERSONALIZED DATA VISUALIZATION SYSTEM

(71) Applicant: SAP SE, Walldorf (DE)

(72) Inventors: Nikolai Jannik Podlesny, Berlin (DE); Tristan Poetzsch, Frankfurt (DE)

(73) Assignee: SAP SE, Walldorf (DE)

( * ) Notice: Subject to any disclaimer, the term of this patent is extended or adjusted under 35 U.S.C. 154(b) by 24 days.

(21) Appl. No.: 16/213,849

(22) Filed: Dec. 7, 2018

(65) Prior Publication Data

US 2020/0183967 A1 Jun. 11, 2020

(51) Int. Cl.
*G06F 3/00* (2006.01)
*G06F 16/54* (2019.01)

(52) U.S. Cl.
CPC .................... *G06F 16/54* (2019.01)

(58) Field of Classification Search
CPC ....... G06F 16/285; G06F 16/54; H04L 67/22; H04L 67/306
See application file for complete search history.

(56) References Cited

U.S. PATENT DOCUMENTS

| | | | |
|---|---|---|---|
| 8,314,798 B2 | 11/2012 | Neelakantan | |
| 8,823,710 B2 | 9/2014 | Dang | |
| 9,081,466 B2 | 7/2015 | Gauthier | |
| 9,449,302 B1* | 9/2016 | Marantz | G06Q 50/01 |
| 9,633,076 B1 | 4/2017 | Morton | |
| 9,870,629 B2 | 1/2018 | Cardno | |
| 2012/0329030 A1* | 12/2012 | Leininger | G09B 7/02 434/350 |
| 2016/0248864 A1* | 8/2016 | Loia | G06Q 50/01 |
| 2017/0221240 A1 | 8/2017 | Stetson | |

OTHER PUBLICATIONS

Maria Golemati et al., A Context-Based Adaptive Visualization Environment, Jan. 1, 2006, IEEE Xplore, pp. 1-6 (Year: 2006).*
Daryl H. Hepting, Towards a Visual Interface for Information Visualization, Jan. 1, 2002, IEEE Xplore, pp. 1-8 (Year: 2002).*
Carenini, et al., Highlighting interventions and user differences-informing adaptive information visualization support, 2013, 10 pages.

* cited by examiner

*Primary Examiner* — Tam T Tran
(74) *Attorney, Agent, or Firm* — Mintz Levin Cohn Ferris Glovsky and Popeo, P.C.

(57) ABSTRACT

Systems, methods, and techniques to efficiently and effectively automate and personalize data visualization images. The method can include receiving at least one input from a user via an input/output device, and the at least one input can be associated with at least one prompt provided by the system to the user via the input/output device. The method can further include determining a purpose associated with at least one set of data. The purpose can define a use of the at least one set of data and the use can be defined by the user. The method can further include determining a personalized data visualization image of the at least one set of data for display to the user in response to the received at least one input and the determined purpose. The method can further include displaying the personalized data visualization image on a display for viewing by the user.

12 Claims, 5 Drawing Sheets

PERSONALIZED DATA VISUALIZATION SYSTEM

The subject matter described herein relates to various embodiments of an automated and personalized data visualization system.

BACKGROUND

One current challenge associated with data analytics application include the increasing complexity associated with data sets. At least some current applications are not equipped to generate visual overviews of such complex data sets. Furthermore, some applications that can analyze complex data sets can be difficult to use or less appealing for less sophisticated data analyzers.

SUMMARY

This document presents systems, methods, and techniques to automate and personalize data visualization. In one aspect, there is provided a system. The system may include at least one data processor and at least one memory. The at least one memory may store instructions that result in operations when executed by the at least one data processor. The operations may include receiving, by at least one processor, at least one input from a user via an input/output device. The at least one input may be associated with at least one prompt provided to the user via an input/output device. The operation may further include determining, by the at least one processor, a purpose associated with at least one set of data. The purpose may define a use of the at least one set of data, the use being defined by the user. In addition, the operation may include determining, by the at least one processor, a personalized data visualization image of the at least one set of data for display to the user in response to the received at least one input and the determined purpose. Additionally, the operation may include displaying, by the at least one processor, the personalized data visualization image on a display for viewing by the user.

In some variations, one or more features disclosed herein including the following features may optionally be included in any feasible combination. The prompt may include a type of visual representation of data. The input may include an indication relative to an understanding by the user of the prompt provided by the system. The personalized data visualization image may include one or more of a graph, a chart, a scatter plot. The determined purpose may include monitoring the at least one set of data or analyzing the at least one set of data. The prompt may include a question regarding an education level of the user and/or an age of the user.

In another aspect, there is provided a method for using a machine learning model to generate recommendations for forming a process flow. The method may include receiving, by at least one processor, at least one input from a user via an input/output device. The at least one input may be associated with at least one prompt provided to the user via an input/output device. The method may further include determining, by the at least one processor, a purpose associated with at least one set of data. The purpose may define a use of the at least one set of data, the use being defined by the user. In addition, the method may include determining, by the at least one processor, a personalized data visualization image of the at least one set of data for display to the user in response to the received at least one input and the determined purpose. Additionally, the method may include displaying, by the at least one processor, the personalized data visualization image on a display for viewing by the user.

In another aspect, there is provided a computer program product that includes a non-transitory computer readable storage medium. The non-transitory computer-readable storage medium may include program code that causes operations when executed by at least one data processor. The operations may include receiving, by at least one processor, at least one input from a user via an input/output device. The at least one input may be associated with at least one prompt provided to the user via an input/output device. The operation may further include determining, by the at least one processor, a purpose associated with at least one set of data. The purpose may define a use of the at least one set of data, the use being defined by the user. In addition, the operation may include determining, by the at least one processor, a personalized data visualization image of the at least one set of data for display to the user in response to the received at least one input and the determined purpose. Additionally, the operation may include displaying, by the at least one processor, the personalized data visualization image on a display for viewing by the user.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the prediction of anomalies in the operations of a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter is directed to automating personalized data visualization images, such as graphs, charts, plots, etc., to thereby improve the efficiency and effectiveness for a user monitoring or analyzing data. For example, various embodiments of an automated data visualization system are described herein that are configured to generate a user profile for a user. The user profile can define and/or categorize various aspects of the user, such as education level, level of understanding of analyzing data, etc. As such, the system can use various information associated with the user profile for assisting with generating a personalized data visualization image. In some embodiments, the system can also determine a purpose for which the user is interacting with or viewing the data. For example, the system can determine what type of data analytics is being performed on the data and/or is desired to be performed on the data, such as comparing data sets (e.g., analyzing data) or spotting relevant deviations in a data set (e.g., monitoring data). As such, the system can use the user profile and the determined purpose for assisting with generating the personalized data visualization images, which can efficiently and effectively allow the user to view data for the intended purpose.

Figure 1:
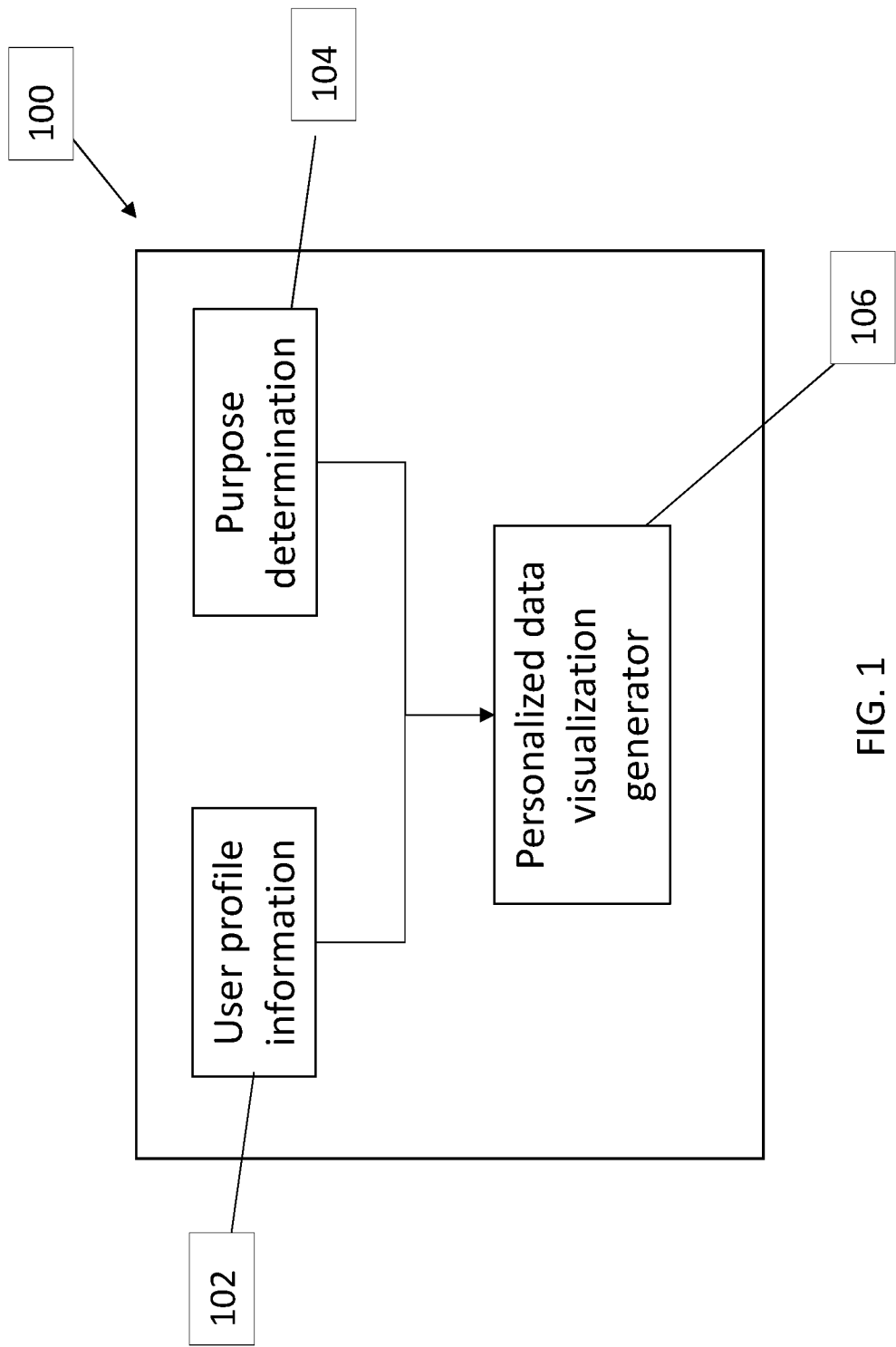
FIG. 1 depicts a diagram of an automated data visualization system, in accordance with some example embodiments.

FIG. 1 depicts a diagram illustrating an automated data visualization system 100 consistent with implementations of the current subject matter. As shown in FIG. 1, the system 100 can include a user profile engine 102 that collects user information, such as to allow the system to categorize the user (e.g., level of data analytics understanding, etc.), as will be discussed in greater detail below. The system 100 can also include a purpose engine 104 that is configured to determine a purpose for which the user wants to view one or more sets of data. For example, the purpose engine 104 can determine that the user would like to monitor a trend along a data set or analyze differences between two data sets. As shown in FIG. 1, the system 100 can also include a personalized data visualization engine 106 that can collect information from the user profile engine 102 and the purpose engine 104 to automatically generate personalized data visualization images, such as graphs, charts, plots, that can be efficiently and effectively understood by the user, as will be discussed in greater detail below.

As discussed above, the system 100 can include a user profile engine 102 that is configured to generate a user profile associated with a user. In some embodiments, when generating the user profile the system 100, including the profile engine 102, may display a series of prompts or questions for the user to answer. Such questions can be directed to a variety of aspects associated with the user and/or the level of knowledge of the user. The system 100 can collect the user input (e.g., answers to the questions provided by the system 100) to assist with generating the user profile.

For example, the questions provided by the user profile engine 102 can include questions related to an education level of the user, a level of understanding of data analytics by the user, specific examples of data analytics that require the user to identify aspects of the example, etc. For example, the user profile engine 102 may display an example analytics chart or formula for evaluating data and ask the user either to identify what is being displayed and/or whether the user is familiar with what is being shown. The response input by the user can be collected by the user profile engine 102 to be included in the generated user profile. For example, such response input can be used by the user profile engine 102 to determine and define a level of experience or knowledge of the user related to data analytics, which can assist the system 100 in generating personalized data visualization images, as will be described in greater detail below. The system 100 can ask any number of questions to the user and collect information about the user in any number of a variety of ways. Furthermore, the system 100 can use the collected responses input by the user in any number of a variety of ways for characterizing the knowledge level and/or data analytics understanding of the user to thereby assist the system 100 with generating personalized data visualization images.

Figure 2:
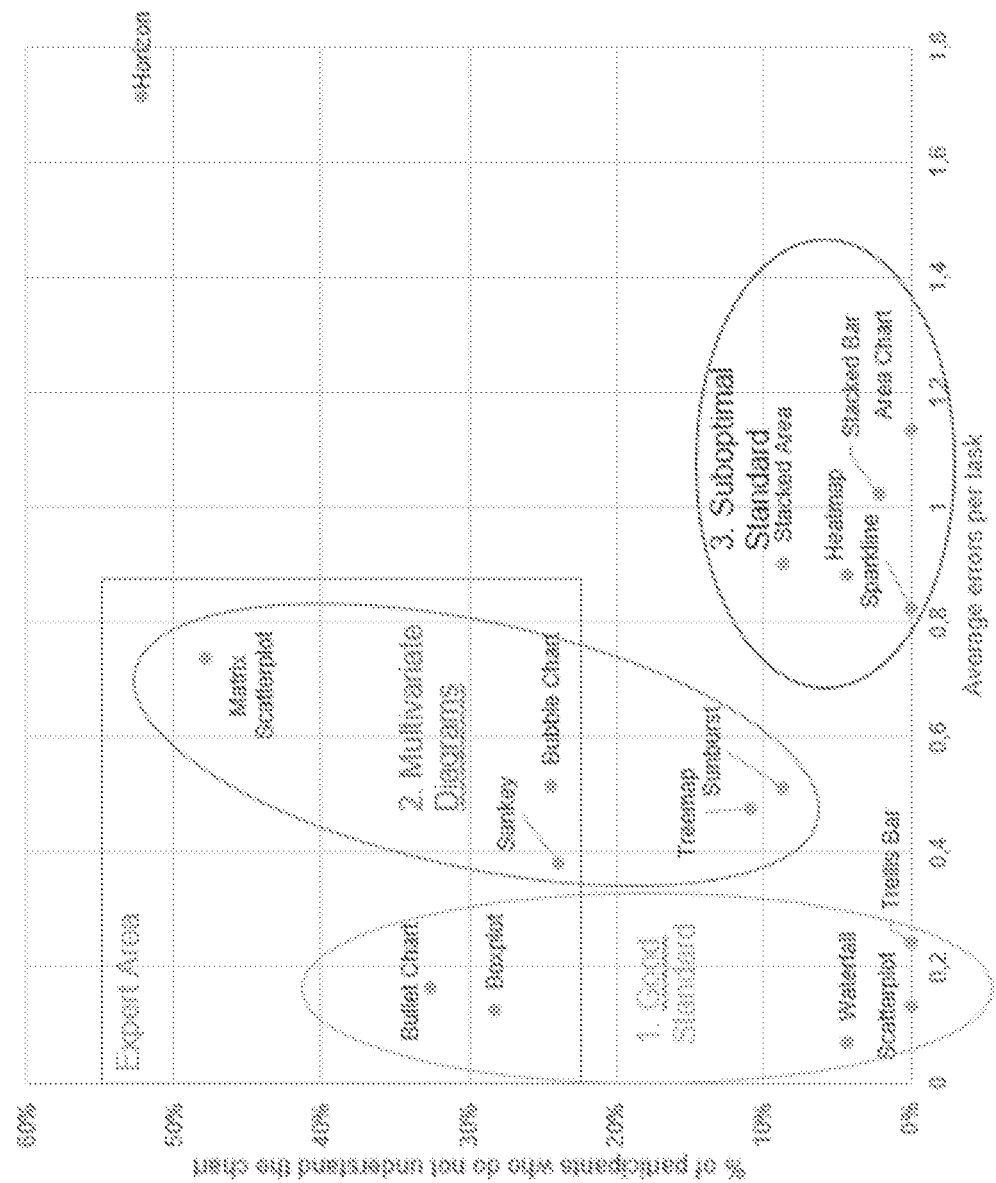
FIG. 2 depicts an embodiment of a chart for choosing appropriate visualization types for different user groups, in accordance with some example embodiments.

FIG. 2 depicts an example chart 200 that can be compiled (e.g., by the user profile engine 102) and/or used by the system 100 to assist with generating personalized data visualization images. As shown in FIG. 2, the chart 200 can group input collected from at least one user for determining a level of understanding of data analytics of the user. As shown in FIG. 2, the system 100 can evaluate an average number of errors per task or question (e.g., as indicated along the x-axis of the chart 200 in FIG. 2) and a percentage of participants or users who do not understand a chart or object displayed to the participants or users (e.g., as indicated along the y-axis of the chart 200 in FIG. 2).

In some embodiments, the system 200 is configured to provide a perceptual speed test where a user is provided a question or prompt and an opportunity to answer within a given time. If the user did not answer within the given time, the system 100 can treat such non-response as an incorrect answer. Other tests can include matching patterns, such as matching patterns while being distracted with a separate image. In some embodiments, various example graphs are provided to the user and the user is asked to provide a familiarity level with each graph (e.g., based on a scale of 1 to 5, etc.). Any of the questions provided to the user can require an answer be input by the user within a predetermined time.

Any one of the test results and input can be stored in a user profile (e.g., by the user profile engine 102), including information contained in a compiled results analysis, such as the chart 200 shown in FIG. 2, for assisting the system 100 with determining a level of knowledge and/or data analytics understanding by the user. For example, the system 100, including the user profile engine 102, can perform a cluster analysis and or multiple linear regressions of the answers/ input provided by the user. From such analysis, the system 100 can in some embodiments categorize the user, such as an expert in data analysis. Such categorization can allow the system 100 to determine an appropriate visual representation of data, thus providing personalized data visualization images.

Some example data visualization images can include a scatterplot, trellis chart, waterfall, boxplot, bullet chart, sparkline, heatmap, stacked bar chart, area chart, stacked area chart, sunburst, treemap, matrix scatterplot, sankey chart, bubble chart. Other charts, graphs, plots, etc. are within the scope of this disclosure.

The user profile engine 102 may adapt over time, such as to fit one or more individual preferences. For example, such preferences may be detected based on one or more actions performed by the user (e.g., repeated changes to a recommended visualization and/or requests for additional information to be displayed, etc.).

As discussed above, in some implementations the system 100 includes a purpose engine 104 configured to determine a purpose the user is intending to use one or more sets of data for, such as analyzing data (e.g., comparing data sets) or monitoring data (e.g., observing a trend within a data set). For example, the determined purpose can be used by the personalized data visualization generator 106 for generating personalized data visualization images, including automatically, that are most effective and efficient for a user.

In some embodiments, the purpose engine 104 can determine the purpose of the data for the user based on one or more actions and/or interactions the user performs with the data. For example, such actions or interactions can include selecting more than one set of data, sorting data, filtering data, etc. Any number of actions and/or interactions can be considered by the purpose engine 104 for determining the purpose for which data is being analyzed by the user. For example, if the user selects two data sets, the purpose engine 104 may determine that the user wants to compare the data. However, if the user selects a single set of data, the purpose engine 104 may determine that the user wants to monitor or observe a trend along the data. As such, the personalized data visualization generator 106 can use such determined purpose for selecting and generating an appropriate data visualization image (e.g., chart, graph, etc.) to most effectively and efficiently display the data for the user to view and analyze.

The purpose engine 104 may take into consideration a path that the user took to arrive at any given point, such as one or more selections made when accessing and/or interacting with a data set. For example, a consideration can include views and/or data sets selected, as well as data set content.

In some embodiments, the personalized data visualization generator 106 can generate the personalized data visualization images automatically. For example, after the user profile engine 102 generates a user profile for a user, the personalized data visualization generator 106 can access user profile information, such as discussed above (e.g., data analysis knowledge level, education level, etc.). As such, when the user selects one or more data sets and/or performs one or more actions/interactions associated with data, the purpose engine 104 can determine a purpose, which can be provided to the personalized data visualization engine 106 (in addition to the user profile information) for automatically generating a personalized data visualization images of the data of interest.

Figures 3A, 3B:
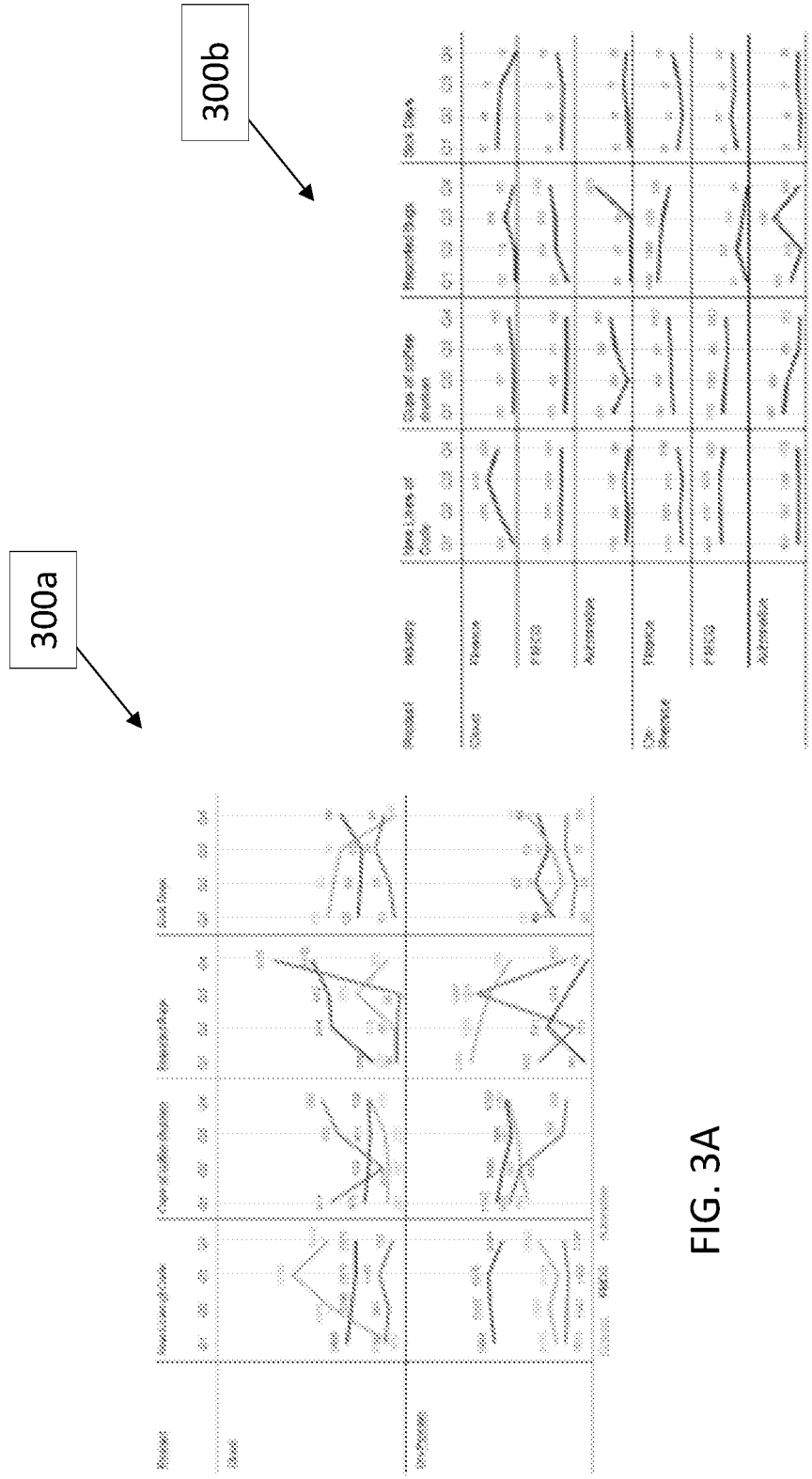
FIG. 3A depicts an embodiment of personalized data visualization images generated by the automated data visualization system.
FIG. 3B depicts another embodiment of personalized data visualization images generated by the automated data visualization system.

FIGS. 3A and 3B depict embodiments of a personalized data visualization images consistent with implementations of the current subject matter. As shown in FIG. 3A, the personalized data visualization engine 106 can generate a plurality of line graphs 300a that allow data sets to be compared against each other. For example, the purpose engine 104 may have determined that the user wants to compare data sets after selecting more than one data set. As such, the personalized data visualization engine 106 can use the determined purpose along with user profile information from the user profile engine 102 to generate the line graphs illustrated in FIG. 3A. Furthermore, the line graphs in FIG. 3A can be personalized to the user by being configured such that they can be easily understood and evaluated by the user, such as based on the user profile information of the user (e.g., education level, determined level of data analytics knowledge, etc.).

As shown in FIG. 3B, the personalized data visualization engine 106 can generate individual line graphs 300b that allow a user, for example, to observe a trend or any outliers within a data set. For example, the purpose engine 104 may have determined that the user wants to monitor or analyze one or more aspects of a data set after selecting a single data set. As such, the personalized data visualization engine 106 can use the determined purpose along with user profile information from the user profile engine 102 to generate the single line graphs illustrated in FIG. 3B. Furthermore, the single line graphs in FIG. 3B can be personalized to the user by being configured such that they can be easily understood and evaluated by the user, such as based on the user profile information of the user (e.g., education level, determined level of data analytics knowledge, etc.).

Although illustrated in FIGS. 3A and 3B as line graphs, the personalized data visualization engine 106 can generate any number of data visualization images, including any discussed herein, without departing from the scope of this disclosure. For example, as the data analytics knowledge and sophistication of the user increases, the personalized data visualization engine 106 can generate increasingly more complex and sophisticated visual depictions of the data, which can allow for a variety of analysis of the data.

Figure 4:
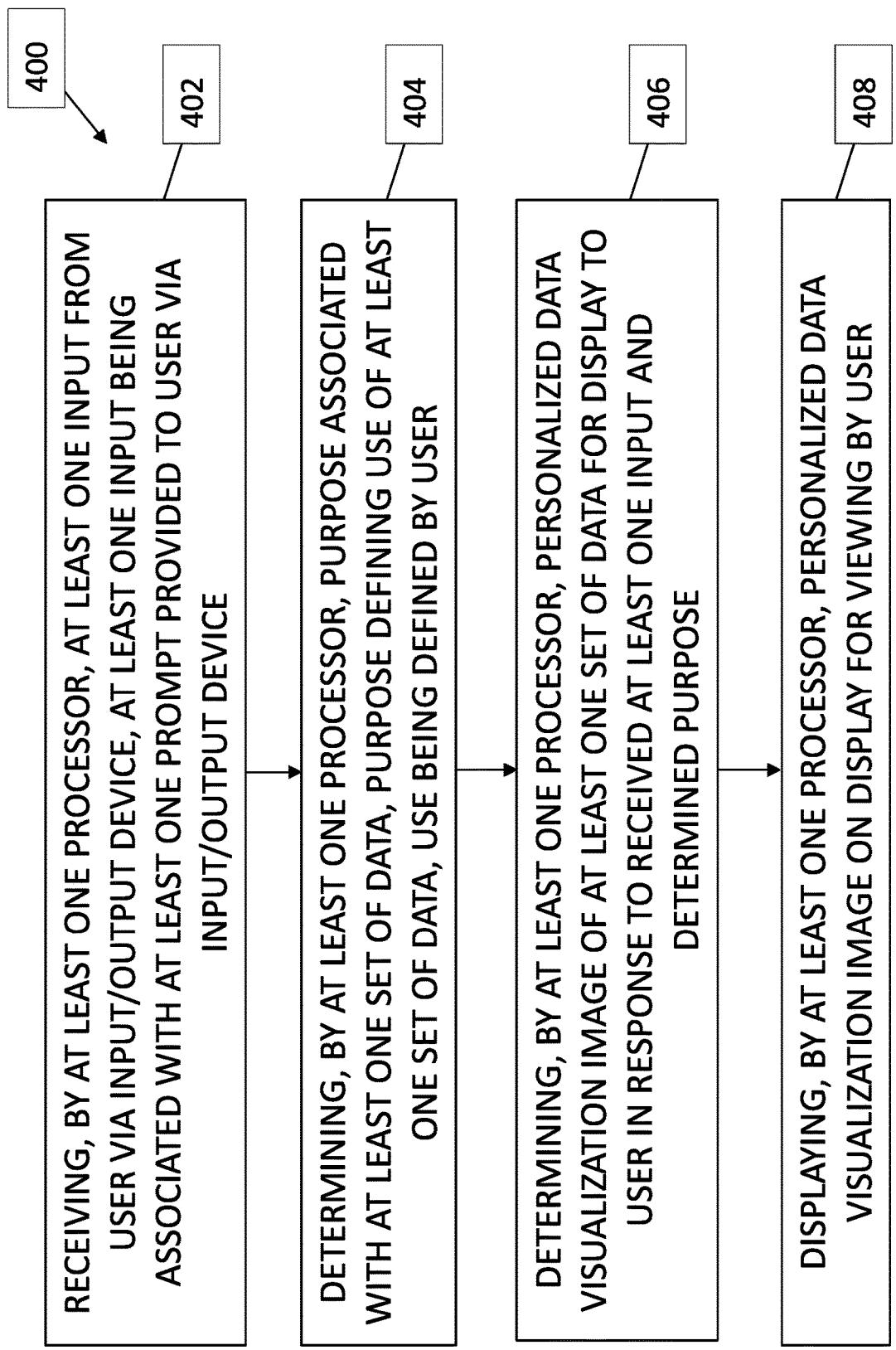
FIG. 4 depicts a flowchart illustrating a process for generating a process flow, in accordance with some example embodiments.

FIG. 4 depicts a flowchart of a process 400 for generating a process flow, in accordance with some example embodiments. For example, at least a part of the process 400 may be performed by the automated data visualization system 100, as illustrated in FIG. 1.

At 402, at least one input from a user (via an input/output device) is received by at least one processor of the automated data visualization system 100, including the user profile engine 102. The at least one input can be associated with at least one prompt that is provided to the user (via the input/output device) by the automated data visualization system 100. At 404, a purpose associated with at least one set of data can be determined, such as by the purpose engine 104. The purpose can define a use of the at least one set of data, and the use can be defined by the user. At 406, a personalized data visualization image of the at least one set of data for display to the user can be determined (e.g., by the personalized data visualization engine 106) in response to the received at least one input and the determined purpose. At 408, the personalized data visualization image can be displayed on a display for viewing by the user.

In some embodiments, the prompt can include a type of visual representation of data. In addition, the input can include an indication relative to an understanding by the user of the prompt provided by the system. In some embodiments, the prompt can include a question regarding an education level of the user and/or an age of the user. Additionally, the personalized data visualization image can include one or more of a graph, a chart, a scatter plot. In some embodiments, the determined purpose can include monitoring the at least one set of data or analyzing the at least one set of data.

Figure 5:
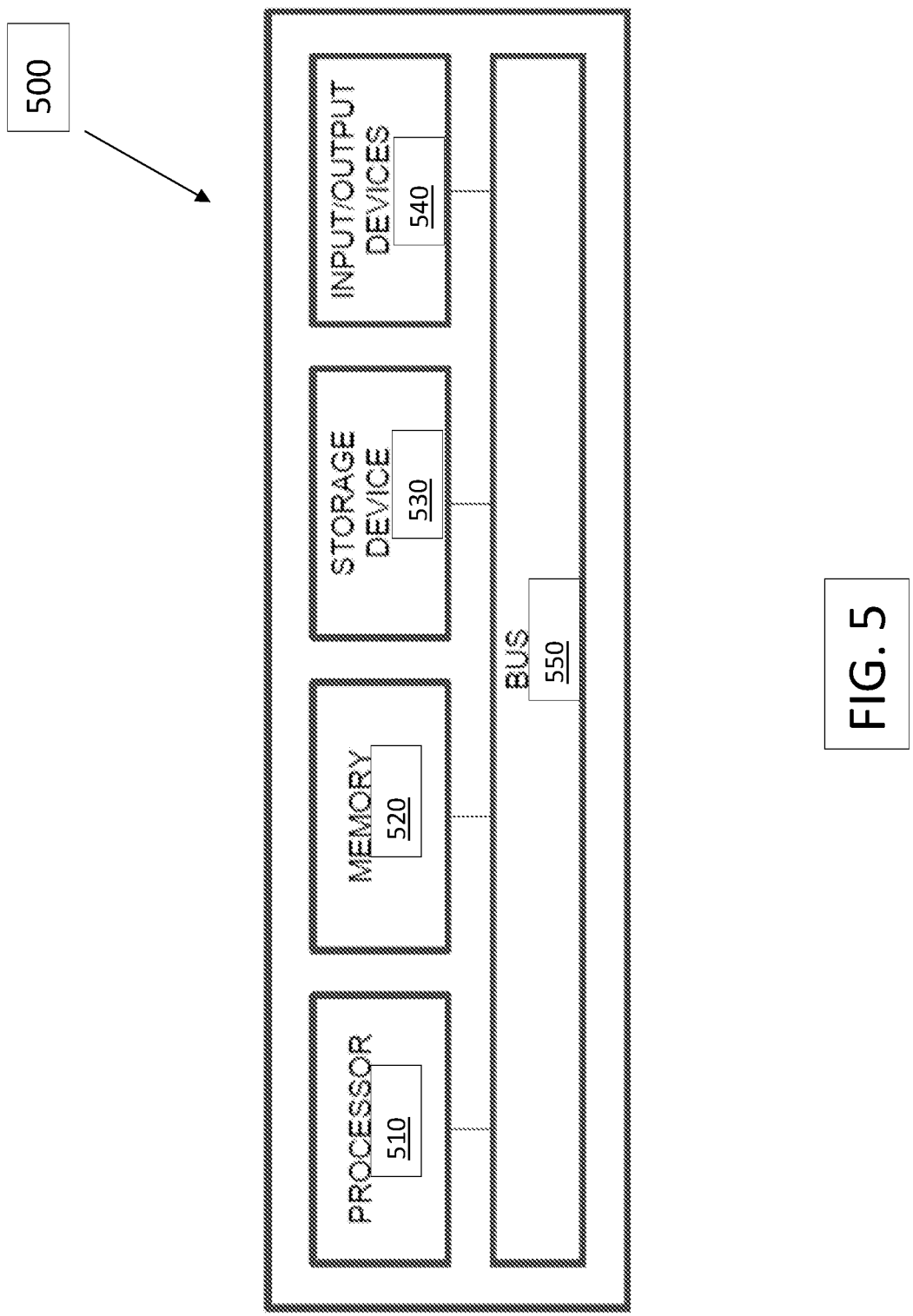
FIG. 5 depicts a block diagram illustrating a computing system, in accordance with some example embodiments.

FIG. 5 depicts a block diagram illustrating a computing system 500 consistent with implementations of the current subject matter. For example, referring to FIG. 1, the computing system 500 can be used to implement the system 100, including the user profile engine 102, the purpose engine 104, and/or the personalized data visualization engine 106.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the user profile engine 102, the purpose engine 104, and/or the personalized data visualization engine 106. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving, by at least one processor, at least one input from a user via an input/output device, the at least one input being associated with at least one prompt provided to the user via an input/output device, the at least one input indicative of a response to a test of the user's ability to understand different types of data visualization images used in data analytics;
   determining, by the at least one processor, a purpose associated with at least one set of data, the purpose defining a use of the at least one set of data, the use being defined by the user and comprising comparing the at least one set of data with another set of data, observing a trend in the at least one set of data, monitoring the at least one set of data, and/or analyzing the at least one set of data;
   determining, by the at least one processor, a personalized data visualization image of the at least one set of data for display to the user, the personalized data visualization image personalized for the user based at least on the determined purpose and the at least one input indicative of the response to the test of the user's ability; and
   displaying, by the at least one processor, the personalized data visualization image on a display for viewing by the user.

2. The method of claim 1, wherein the personalized data visualization image is determined by selecting at least one of the following specific types of data visualization images: an area chart, a bar chart, a stacked bar chart, a sparkline, a heatmap, a sunburst, a treemap, a bubble chart, a Sankey, a matrix plot, a waterfall, a scatter chart, a box plot, a graph, a chart, and a bullet chart.

3. The method of claim 2, wherein the at least on input further indicates an educational level of the user.

4. The method of claim 1, wherein the determining of the purpose is performed in response to selecting and/or interacting with the at least one data set.

5. A system, comprising:
   at least one data processor; and
   at least one memory storing instructions which, when executed by the at least one data processor, result in operations comprising:
   receiving, by at least one processor, at least one input from a user via an input/output device, the at least one input being associated with at least one prompt provided to the user via an input/output device, the at least one input indicative of a response to a test of the user's ability to understand different types of data visualization images used in data analytics;
   determining, by the at least one processor, a purpose associated with at least one set of data, the purpose defining a use of the at least one set of data, the use being defined by the user and comprising comparing the at least one set of data with another set of data, observing a trend in the at least one set of data, monitoring the at least one set of data, and/or analyzing the at least one set of data;
   determining, by the at least one processor, a personalized data visualization image of the at least one set of data for display to the user, the personalized data visualization image personalized for the user based at least on the determined purpose and the at least one input indicative of the response to the test of the user's ability; and
   displaying, by the at least one processor, the personalized data visualization image on a display for viewing by the user.

6. The system of claim 5, wherein the personalized data visualization image is determined by selecting at least one of the following specific types of data visualization images: an area chart, a bar chart, a stacked bar chart, a sparkline, a heatmap, a sunburst, a treemap, a bubble chart, a Sankey, a matrix plot, a waterfall, a scatter chart, a box plot, a graph, a chart, and a bullet chart.

7. The system of claim 6, wherein the determining of the purpose is performed in response to selecting and/or interacting with the at least one data set.

8. The system of claim 5, wherein the determining of the purpose is performed in response to selects and/or interacts with the at least one data set.

9. A non-transitory computer-readable medium storing instructions, which when executed by at least one data processor, result in operations comprising:
   receiving, by at least one processor, at least one input from a user via an input/output device, the at least one input being associated with at least one prompt provided to the user via an input/output device, the at least one input indicative of a response to a test of the user's ability to understand different types of data visualization images used in data analytics;
   determining, by the at least one processor, a purpose associated with at least one set of data, the purpose defining a use of the at least one set of data, the use being defined by the user and comprising comparing the at least one set of data with another set of data, observing a trend in the at least one set of data, monitoring the at least one set of data, and/or analyzing the at least one set of data;

determining, by the at least one processor, a personalized data visualization image of the at least one set of data for display to the user, the personalized data visualization image personalized for the user based at least on the determined purpose and the at least one input indicative of the response to the test of the user's ability; and displaying, by the at least one processor, the personalized data visualization image on a display for viewing by the user.

10. The non-transitory computer-readable medium of claim 9, wherein the personalized data visualization image is determined by selecting at least one of the following specific types of data visualization images: an area chart, a bar chart, a stacked bar chart, a sparkline, a heatmap, a sunburst, a treemap, a bubble chart, a Sankey, a matrix plot, a waterfall, a scatter chart, a box plot, a graph, a chart, and a bullet chart.

11. The non-transitory computer-readable medium of claim 10, wherein the at least on input further indicates an educational level of the user.

12. The non-transitory computer-readable medium of claim 9, wherein the determining of the purpose is performed in response to selecting and/or interacting with the at least one data set.

* * * * *